Figure 4:
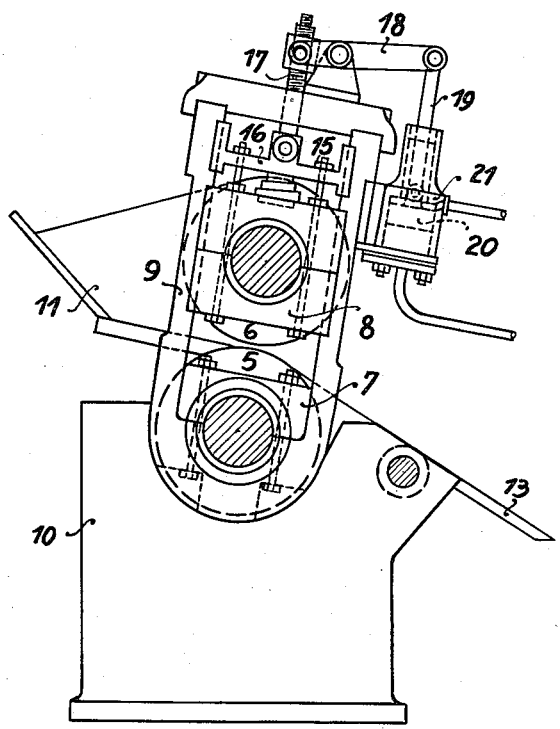

July 28, 1936.  L. VON REIS  2,048,830
MANUFACTURE OF GLASS SHEETS
Filed May 24, 1934  2 Sheets-Sheet 1
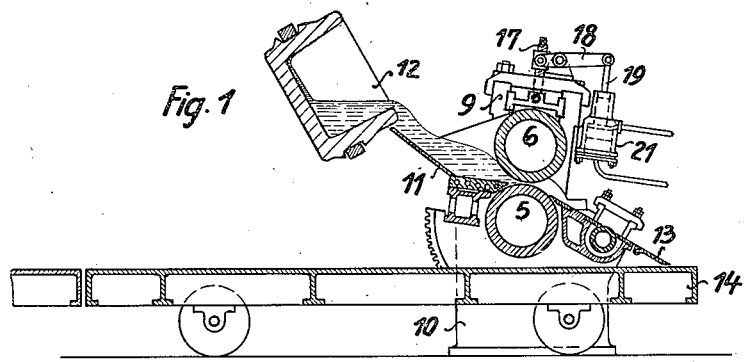
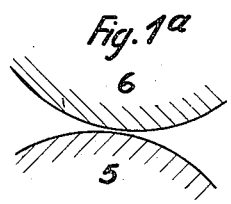
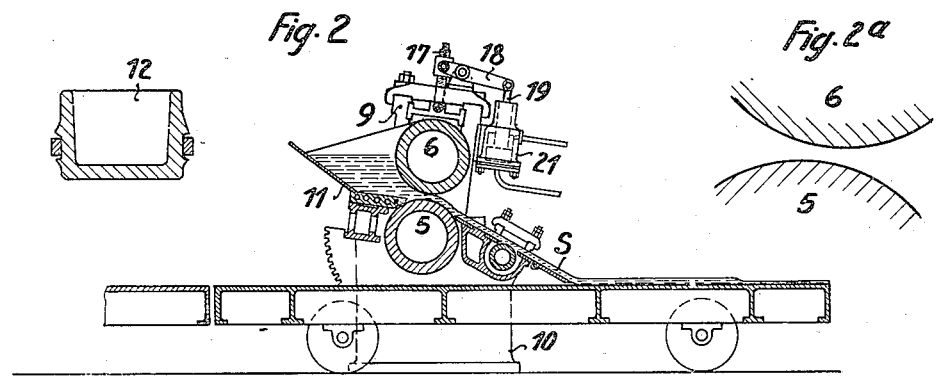
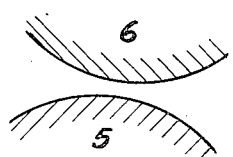
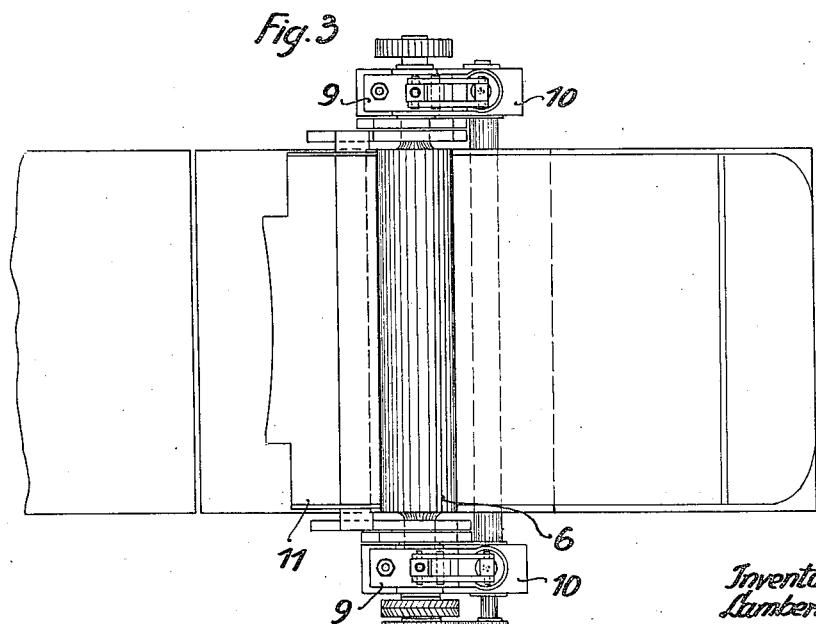
Inventor:
Lambert von Reis
per
Dorsey & Cole
Attorney.

July 28, 1936.    L. VON REIS    2,048,830
MANUFACTURE OF GLASS SHEETS
Filed May 24, 1934    2 Sheets-Sheet 2

Inventor:
Lambert von Reis
per
Lloyd H Cole
Attorney.

Patented July 28, 1936

2,048,830

UNITED STATES PATENT OFFICE 2,048,830

MANUFACTURE OF GLASS SHEETS

Lambert von Reis, Herzogenrath, Germany, assignor, by mesne assignments, to The American Bicheroux Company, a corporation of Delaware Application May 24, 1934, Serial No. 727,325
In Germany August 3, 1933

4 Claims. (Cl. 49—33)

In the manufacture of glass sheets on multi-roll rolling machines the viscous glass mass delivered to the rolling mechanism takes a certain time to distribute on the full width of this mechanism. As a result thereof, the forward portion or head of the glass sheet emerging from between the forming rolls has an irregular, for instance rounded or pointed shape, which means that the head portion does not have a width corresponding to the set or full width of the rolling mechanism. This irregular head is ordinarily severed from the glass sheet and rejected. As it is customary to adjust the forming pass for the desired final thickness of the glass sheet from the beginning of the rolling operation, serious losses of glass are entailed by the said irregular head.

Various proposals have been made for avoiding this irregular head, but they have not been adopted in actual practice because the proposed means give themselves rise to considerable losses or to impurifications of the glass.

The invention has for its object to provide a simple and efficient method which allows to avoid or at least essentially reduce the loss of glass otherwise entailed by the irregular sheet head, but which does not possess the drawbacks inherent in the known proposals made for this purpose.

The method according to the invention consists in that, while the rotation of the cooperating rolls is started before the beginning of the rolling operation or at least when the molten glass mass comes into contact with the rolls, the forming pass between them is at first kept so narrow that no glass can be rolled out and the pass is adjusted to final sheet thickness only as soon as the glass mass has spread at the entrance of the forming pass to such extent that the formation of the sheet in the desired width is secured. The production of an irregular sheet head is thus avoided, and owing to the timely rotation of the rolls one-sided heating of the rolls through the hot glass mass and consequent warping of the rolls and adhering of the glass to them cannot occur.

As a modification of the method, the forming pass between the rolls is at first adjusted so that at the beginning of the rolling operation there is rolled out a head portion of a thickness considerably below the final thickness of the sheet. This form of the method is to be preferred for the following reason. As experience shows, the first portion of a mass of molten glass delivered from a melting pot or the like to the rolling mechanism is per se useless. Therefore, if this useless glass is allowed to pass through the forming pass in a thin strip at the beginning of the operation, the sheet following this thin head upon the forming pass having been set for the desired final thickness will only consist of useful pure glass. The loss of glass caused by the cutting off of this thin head is considerably smaller than in the known methods because with these the respective head has the full thickness of the main portion of the sheet.

The essential reduction of the loss of glass when rolling the head portion in a thickness much below the final sheet thickness will be easily understood from the following example.

It is assumed that a glass sheet should be rolled having a thickness of 10 millimetres and a width of 4 metres corresponding to the width of the conveyors or the length of the forming rolls. Under these conditions the irregular head formed in the rolling operation generally obtains a length ranging between 1.80 and 0.80 m. In accordance therewith the medium loss will be 2.1.30.10=26 liters of glass when working according to the methods now in use. If, however, in accordance with the present method the head of the sheet is rolled for instance in a thickness of 3 millimetres, the loss of glass is reduced to 2.1.30.3=7.8 liters. The gain of glass is therefore about 17 liters or 1.7m$^2$ of sheet glass of 10 mm., if the small piece of transition form 3 to 10 mm. is also taken into the calculation.

The method according to the invention does not require any change of the usual mode of working. It is only necessary to adjust the co-operating rolls so that at the beginning of the operation the forming pass is closed or very narrow and increased to correspond to the desired final sheet thickness as soon as the glass mass has spread to the required width at the entrance of the forming pass.

The accompanying drawings illustrate by way of example a multi-roll sheet glass rolling machine adapted to be used for carrying out the method according to the invention.

Figs. 1 and 2 are sectional views of a Bicheroux sheet glass rolling machine with the forming rolls in different relative positions. Figs. 1a and 2a are fractional sections illustrating the different sizes of the forming pass between the co-operating rolls, on an enlarged scale. Fig. 3 is a plan view of the machine. Fig. 4 is an enlarged side elevation of the machine frame with the roll bearings.

5 and 6 are the forming rolls carried by bearings 7 and 8 which are mounted in standards 9 tiltably supported by the base members 10. Arranged in front of the rolls 5, 6 is the receiver 11 onto which the glass mass to be formed into sheets is delivered by means of the melting pots 12 or in any other approved way. The sheet S formed between the rolls passes down over a chute 13 to the traveling tables 14 or other suitable conveying means.

The bearings 8 of the upper roll 6 are vertically adjustable in the standards 9. They are suspended by means of bolts 15 from slide members 16 to which rods 17 are connected passing through the tops of the standards 9 and pivoted to the one ends of levers 18. Attached to the other ends of these levers are the connecting rods 19 of pistons 20 of pressure cylinders 21. By the application of the pressure medium on one or the other side of the pistons 20 the upper roll 6 is either lowered or raised. The stroke of adjustment may be limited by suitable stops. The means shown allow the rolls 5 and 6 to be adjusted relatively to each in such a manner that at the beginning of the rolling operation the forming pass between the rolls is either closed or very narrow, as shown in Figs. 1 and 1a, and afterwards increased to a size corresponding to the desired final thickness of the glass sheet, as shown in Figs. 2 and 2a.

While the drawings show a machine in which the upper roll is adjustable, it will be understood that the desired effect can also be attained by making the lower roll or both rolls adjustable.

The method according to the invention can also be used in connection with machines, to which the liquid glass mass is fed from a tank instead of from melting pots.

Having thus described my invention, what I claim as new and desire to secure by Letters Patent is:—

1. A method of rolling glass sheets on a multi-roll rolling machine, consisting in delivering a mass of molten glass to the forming pass between the cooperating rolls, starting the rotation of the rolls at least at the moment the molten glass comes into contact with them, rolling the first portion of the sheet in a thickness essentially smaller than the desired final thickness, and rolling the sheet in its final thickness as soon as the glass mass has spread at the entrance of the forming pass to an extent required to secure the formation of a sheet of the desired width.

2. A method of rolling glass sheets on a multi-roll rolling machine, consisting in delivering a mass of molten glass to the forming pass between the cooperating rolls, starting the rotation of the rolls at least at the moment the molten glass comes into contact with them, setting the rolls at first at a narrow distance to constitute a forming pass of a size below the desired final thickness of the glass sheet to be rolled, and increasing the distance between the rolls to a size corresponding to the final thickness of the sheet as soon as the glass has spread at the entrance of the forming pass to the width intended to be given to the sheet.

3. A method of rolling glass sheets on a multi-roll rolling machine, consisting in delivering a mass of molten glass to the forming pass between the cooperating rolls, starting the rotation of the rolls at least at the moment the molten glass comes into contact with them, setting the rolls at first at such a narrow distance that no glass can pass through between them, and increasing this distance to a size corresponding to the desired final thickness of the sheet as soon as the glass has spread at the entrance of the forming pass to the width intended to be given to the sheet.

4. The method of rolling glass sheets which consists in delivering a mass of plastic glass to a forming pass between a plurality of rolls, separated a distance less than the desired thickness of the sheet to be rolled, thereafter increasing the distance between the rolls to enlarge the pass and rolling the sheet through the enlarged pass to desired thickness.

LAMBERT von REIS.